R. H. BLANTON AND H. L. HOOPER.
DEMOUNTABLE RIM FOR MOTOR TRUCK WHEELS.
APPLICATION FILED DEC. 31, 1919.
1,338,208.
Patented Apr. 27, 1920.
2 SHEETS—SHEET 1.
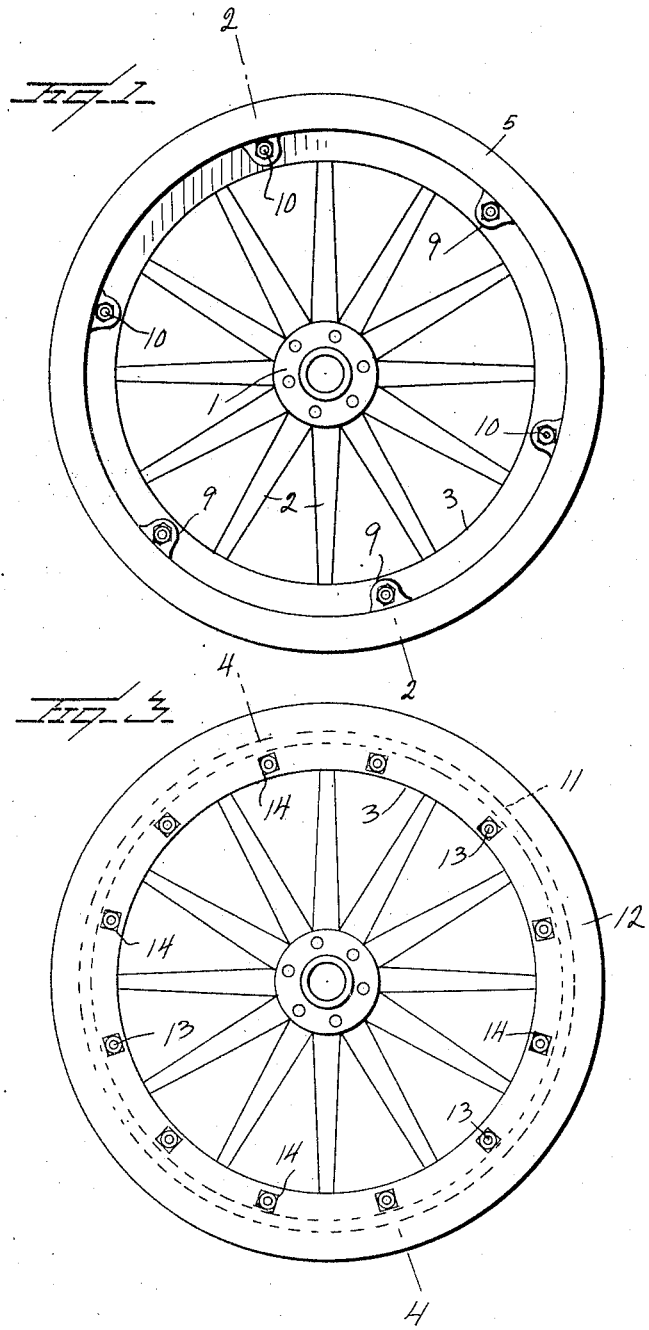
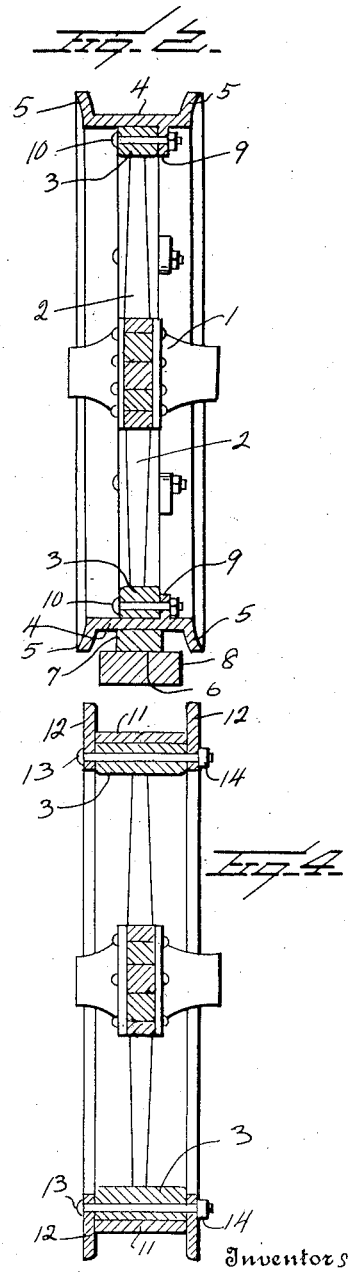
Inventors
R. H. Blanton and
H. L. Hooper.
By Watson E. Coleman
Attorney R. H. BLANTON AND H. L. HOOPER.
DEMOUNTABLE RIM FOR MOTOR TRUCK WHEELS.
APPLICATION FILED DEC. 31, 1919.
1,338,208.
Patented Apr. 27, 1920.
2 SHEETS—SHEET 2.
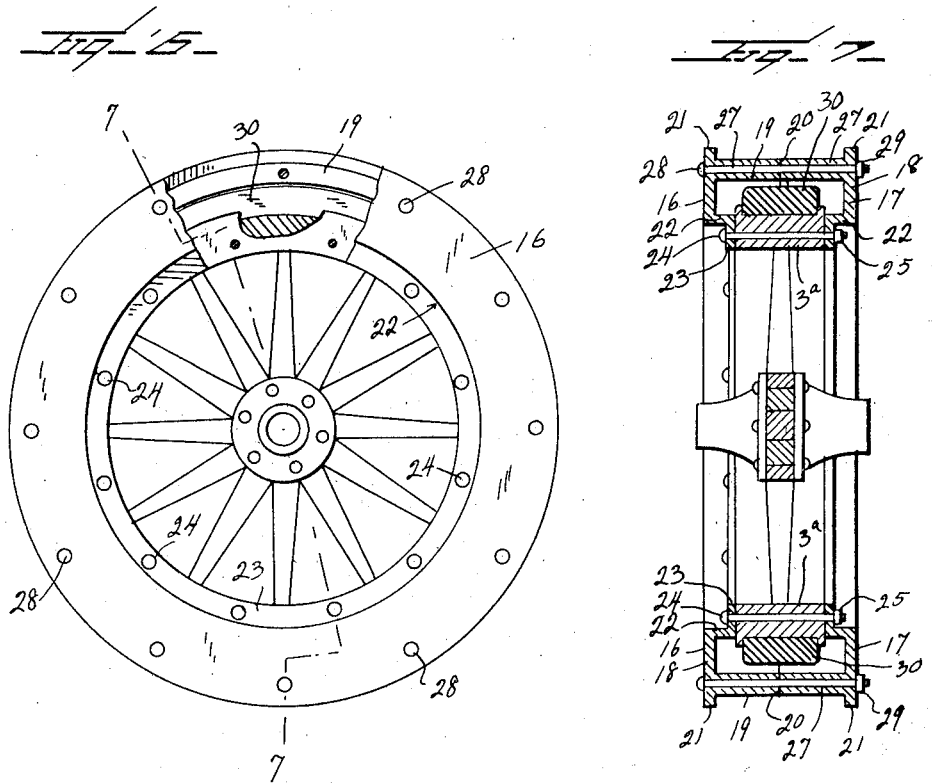
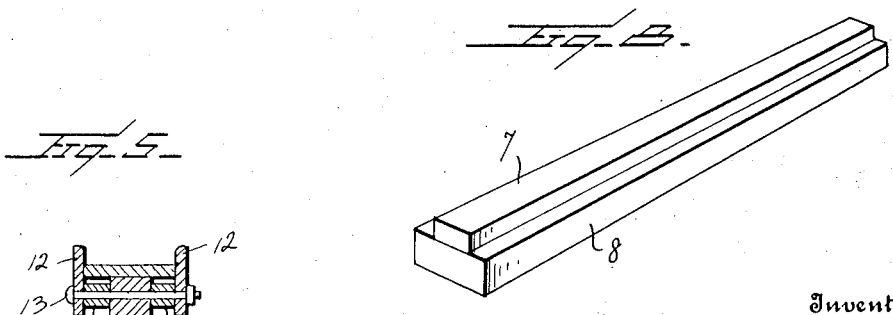
Inventors
R. H. Blanton and
H. L. Hooper
By Watson E. Coleman
Attorney

UNITED STATES PATENT OFFICE.

ROBERT HERMAN BLANTON AND HARRY LOWRY HOOPER, OF SELMA, ALABAMA.

DEMOUNTABLE RIM FOR MOTOR-TRUCK WHEELS.

1,338,208.     Specification of Letters Patent.     Patented Apr. 27, 1920.

Application filed December 31, 1919. Serial No. 348,525.

*To all whom it may concern:*

Be it known that we, ROBERT HERMAN BLANTON and HARRY LOWRY HOOPER, citizens of the United States, residing at Selma, in the county of Dallas and State of Alabama, have invented certain new and useful Improvements in Demountable Rims for Motor-Truck Wheels, of which the following is a specification, reference being had to the accompanying drawings.

In a great many lumber and timber districts, the ground is soft and marshy, and considerable difficulty and trouble are experienced from the use of heavy motor trucks over such soil, owing to the wheels slipping and sinking into the ground, thereby delaying the hauling of the timber and lumber. This experience is more or less encountered during wet weather.

The present invention aims to overcome these difficulties by operating the trucks upon tracks consisting of lengths of lumber arranged end to end, and fastened to boards likewise end to end to form a substantial foundation, on which the trucks are adapted to operate.

This invention has particular relation to an improved demountable rim, especially adapted for motor truck wheels, with or without rubber tires and designed to operate on the tracks, there being no cross ties between the tracks, therefore, the invention aims to provide means forming a part of the demountable rim, not only acting to keep the wheel on the tracks, but also aiming to keep the track sections substantially in alinement.

The invention further aims to provide a heavy broad demountable rim for the motor truck wheel adapted for use in connection with wheels either with or without rubber tires in combination with means for holding the broad demountable rim in place.

The invention still further aims to provide a demountable rim in combination with fastening means therefor, passing transversely through the ordinary wooden felly of the wheel, for demountably securing the broad rim in place.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of a wheel, showing one form of demountable rim as applied thereto, Fig. 2 is a sectional view on line 2—2 of Fig. 1, Fig. 3 is a view in side elevation of a wheel showing another form of demountable rim as applied thereto, Fig. 4 is a vertical sectional view on line 4—4 of Fig. 3, Fig. 5 is a detail sectional view of a part of a wheel felly, showing a modified form of demountable rim as applied thereto, Fig. 6 is a view in side elevation of another form of demountable rim, as applied to a wheel, Fig. 7 is a sectional view on line 7—7 of Fig. 6, and Fig. 8 is a detail perspective view of a lumber track section on which the demountable rim engages.

Referring more especially to the drawings, 1 designates the usual construction of hub provided with radiating spokes 2, and 3 denotes the usual wheel felly to which the spokes 2 are designed to be fastened in any conventional manner.

Ordinarily the felly 3 carries a heavy solid rubber tire, but in the present instance this tire is removed, and in its place a broad metallic rim is arranged on the felly. This metallic rim 4 is provided with radial flanges 5, which extend slightly laterally. Furthermore, the tread surface of the rim between the flanges is designed to be substantially twelve inches, though not necessarily, for it is obvious that this surface can be any other suitable width, and which is designed to operate particularly upon tracks. These tracks such as indicated at 6 in Fig. 2 and also as shown in the detail view on Fig. 8, are composed of sections of lumber substantially 2"x4", though not necessarily, nailed to boards or planks of any suitable dimensions, preferably 2"x6" and which are disposed so that the rim of the truck wheels may operate thereon. The surface between the flanges 5 engages the lumber pieces 7, which are nailed or otherwise secured to the boards or blanks 8. The flanges 5 act to retain the wheels on the tracks as well as holding the sections of the tracks in alinement, as the truck is propelled. This broad metallic demountable rim is designed to be pressed on the felly of the wheel by hydraulic or other pressure, and it is the aim that the rim is designed to engage the felly tight enough, after being forced on the felly, as to obviate the use of bolts, and to depend entirely on the engagement and frictional fitting of the rim on the felly. However, the rim is provided with lugs 9 to prevent movement of the rim in one direction. When the rim is not pressed on by hydraulic pressure, bolts 10 are employed and are designed to pass through the lugs 9 and through the felly to insure holding the rim in position.

In Figs. 3 and 4, the demountable rim comprises the annular metallic rim band 11, which is slipped over the felly 3, and 12 denote detachable flanges which are arranged adjacent the opposite sides of the felly. These radial flanges 12 project sufficiently and radially beyond the band 11, in order to perform the same function as the flanges 5 in Figs. 1 and 2, namely, to retain the wheel in engagement with the tracks, and also to retain the sections of the tracks in alinement. This can be easily accomplished, since the tracks, after being laid, tend to sink into the ground after the passage of the first truck over the tracks. Suitable bolts 13 pass transversely through the felly 3 and through the flanges 12 and receive nuts 14 to hold the foregoing parts together.

In Fig. 5 the felly 3 of the wheel is somewhat narrower than the felly shown in Fig. 4, otherwise the construction of the demountable rim is practically the same as in Fig. 3, or as in Fig. 4. However, the bolts 13 in this instance pass through spacing sleeves 15 which are interposed between the felly and the flanges 12, which are in the form of rings. In Figs. 1 to 5 inclusive it is the aim to remove the usual solid rubber tire from the truck wheel in order to apply the demountable rim. However, in Figs. 6 and 7, it is the aim to provide a demountable rim, which may be applied to truck wheels, without removing the solid rubber tire. In this instance, the demountable rim comprises opposite ring plates 16 and 17 which are disposed concentrically. These ring plates each consist of the radial flanges 18, to which rim sections 19 are integrally connected. These rim sections constitute the tread of the wheel, and have their edges in contact with each other as indicated at 20. This tread, consisting of the rim sections 19, is designed to operate upon the tracks, while the extended parts 21 of the flanges 18 act to retain the tread in engagement with the tracks, as well as holding the track sections in alinement. The winged plates also have the horizontal or cylindrical portions 22, and the radial parts 23. These radial parts 23 lie flat against the opposite sides of the wheel felly 3ª and receive bolts 24 having nuts 25. These bolts 24 pass through the felly 3ª as shown, and act to clamp the ring plates securely in place.

The rim sections 19 overlie the tire 30, and are provided with suitable openings 27. These openings 27 are arranged at intervals, and alternate with the bolts 24. Suitable bolts 28 (which are provided with nuts 29) extend through the openings 27, in fact through the rim sections 19, thereby additionally securing the ring plates to the wheel. In this case, it will be noted that the solid rubber tire 30 remains in position on the felly and is protected by the rim sections 19, which overlie the solid rubber tire.

With this particular type of demountable rim, it will be noted that heavy trucks, particularly those used in lumber and timber districts may be handled more quickly and with less trouble, thereby saving considerable expense in the hauling of the lumber, and also expediting the hauling of the lumber from the place where it is felled to the mill.

In interpreting the following claims, it will be noted that the term "tread part" is employed to imply either the felly when the tire is removed, or the tire when it is applied. For instance, the claims define a heavy truck wheel including a tread part, which is used to cover the tread of the felly, for the reason that when a tire is removed, the outer cylindrical surface of the felly could be used as a tread, although it is not practical to do so. Nevertheless, technically, it defines a tread, and by this phraseology, certain of the claims are drawn to generically cover all forms of the invention, while the seventh claim covers the preferred form, namely the construction shown in Figs. 6 and 7.

The invention having been set forth, what is claimed as new and useful is:—

1. In a demountable rim for truck wheels, the combination with a heavy truck wheel having a relatively narrow tread part, of a metallic demountable rim comprising ring plates concentrically adjacent the opposite faces of the felly of the wheel, means engaging through the felly and through the plates to secure said plates to the felly, a metallic cylindrical band relatively wide arranged over said tread surface between said plates and constituting an auxiliary tread broader relatively to the narrow tread part and adapted to ride upon wood rail sections, said ring plates extending radially outwardly beyond the auxiliary tread surface and acting to swing and rotate the ends of the rail sections in position and also hold the auxiliary tread in engagement with the rail sections.

2. In a demountable rim for heavy truck wheels, a truck wheel having a tread part, a metallic demountable rim acting auxiliary to the first tread part and being at least twice as broad as and adapted to engage relatively narrow rail sections arranged in disconnected alinement, said rim having annular flanges coacting to coöperate with said disconnected ends of the rail sections to cause said rail sections to swing into alinement as the tread surface rides from one rail section to the other, and means for securing said rim to the tread part.

3. In a demountable rim for heavy truck wheels, a truck wheel having a tread part, a metallic demountable rim having a relatively broad tread surface acting auxiliary to the first tread part and adapted to engage relatively narrow rail sections arranged in disconnected alinement, said rim having annular flanges coacting to coöperate with said disconnected ends of the rail sections to cause said rail sections to swing into alinement as the tread surface rides from one rail section to the other, said rim having lugs, and means through said lugs for securing the same to the rim and the tread part.

4. In a demountable rim, a heavy truck wheel having a relatively narrow tread part, a demountable metallic rim comprising opposing ring plates secured to opposite sides of said tread part, said ring plates having parts extending radially toward the center of the wheel, said ring plates having parts extending radially outwardly beyond the tread part, a relatively broad tread surface band between said radial outwardly extending parts acting auxiliary to said narrow tread part and arranged over said relatively narrow tread part and adapted to engage relatively narrow rail sections, said radial outwardly extending parts constituting flanges acting to coöperate with said disconnected ends of the rail sections to cause said sections to swing into alinement as the relatively broad tread surface rides from one rail section to the other.

In testimony whereof we hereunto affix our signatures.

ROBERT HERMAN BLANTON.
HARRY LOWRY HOOPER.